United States Patent [19]

Smith

[11] 4,135,116

[45] Jan. 16, 1979

[54] CONSTANT ILLUMINATION CONTROL SYSTEM

[75] Inventor: Maurice N. Smith, Oxnard, Calif.

[73] Assignee: The United States of America as represented by the Secretary of the Navy, Washington, D.C.

[21] Appl. No.: 870,048

[22] Filed: Jan. 16, 1978

[51] Int. Cl.² .......................................... H05B 37/02
[52] U.S. Cl. ................................. 315/158; 315/151; 315/156; 315/194; 315/307
[58] Field of Search ............... 315/149, 151, 156, 157, 315/158, 194, 199, 291, 307; 250/205

[56] References Cited

U.S. PATENT DOCUMENTS

| | | | |
|---|---|---|---|
| 3,449,629 | 6/1969 | Wigert et al. | 315/158 X |
| 3,500,455 | 3/1970 | Ross et al. | 315/149 |
| 3,531,684 | 9/1970 | Nuckolls | 315/156 X |
| 3,670,202 | 6/1972 | Paine et al. | 315/151 X |
| 4,009,387 | 2/1977 | Nuver | 250/205 |

FOREIGN PATENT DOCUMENTS

2419699  11/1975  Fed. Rep. of Germany ........... 315/158

Primary Examiner—Eugene R. LaRoche
Attorney, Agent, or Firm—Richard S. Sciascia; Joseph M. St.Amand; Andrew S. Viger

[57] ABSTRACT

A constant illumination level control system for continuously adjusting the level of artificial illumination in an area of controlled lighting to complement available natural illumination. A photocell sensor in combination with an input amplifier generates a voltage representative of the illumination level in the area of controlled lighting. This illumination level voltage is compared by a comparator with a reference voltage, a non-zero difference voltage output from the comparator being indicative of a change in the illumination level from a desired, preset level. The output from the comparator is applied to a solid state dimmer circuit which, by controlling the gating of a triac, regulates the electrical energy input to the artificial lighting system. In response to a non-zero difference voltage output from the comparator, the solid state dimmer circuit, in combination with the triac, adjusts the artificial illumination output to reestablish the desired, preset level of total illumination.

14 Claims, 11 Drawing Figures

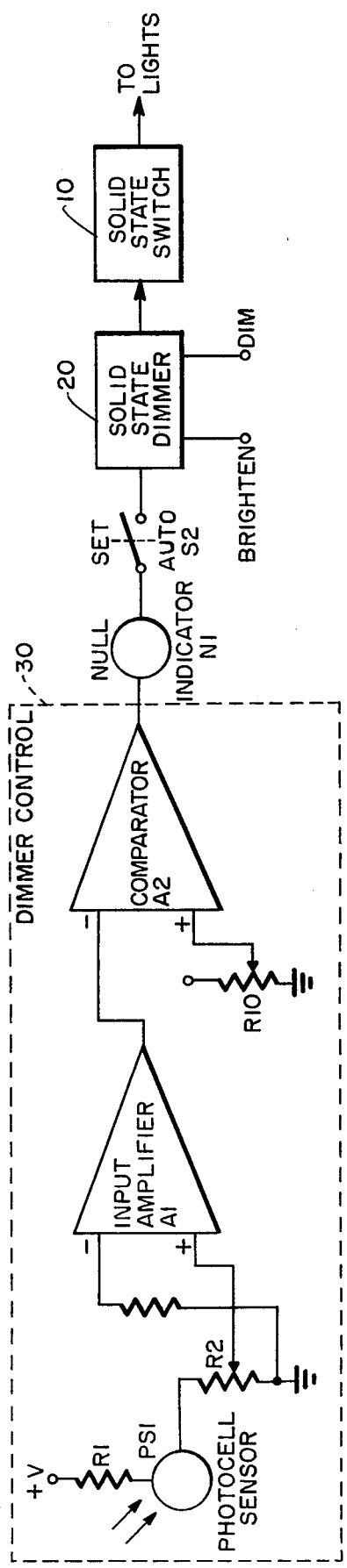
Fig. 1.
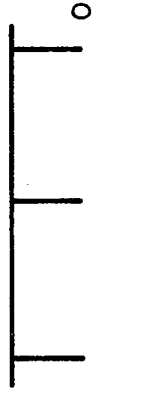
Fig. 2c.
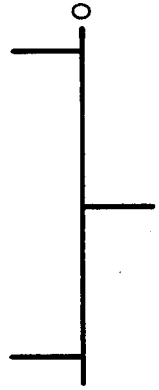
Fig. 2e.
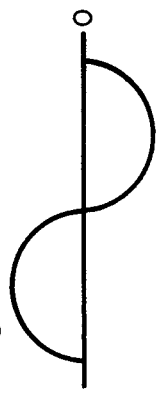
Fig. 2g.
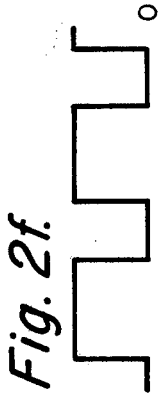
Fig. 2a.
Fig. 2d.
Fig. 2f.
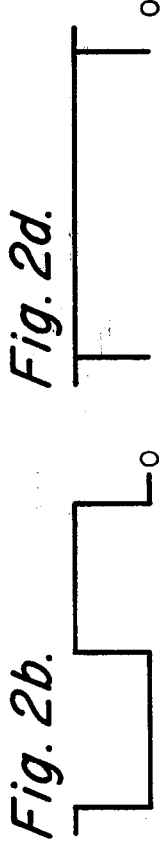
Fig. 2b.
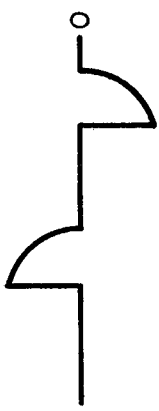
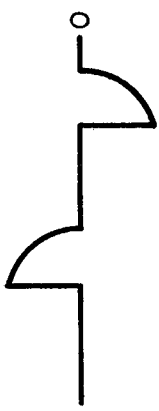
Fig. 2h.

CONSTANT ILLUMINATION CONTROL SYSTEM

BACKGROUND OF THE INVENTION

The present invention relates generally to monitor and control systems for controlling the level of illumination in an area of controlled lighting and more particularly to such a system utilizing a solid state dimming network to regulate the electrical power input to an artificial lighting system.

Many buildings housing working area have large window areas or skylights which, on sunny or moderately overcast days, provide sufficient natural illumination that the need for artificial illumination is eliminated, or at least reduced. In view of the present day interest in energy conservation, it would be highly desirable to incorporate into artificial lighting systems a system to take advantage of the availability of natural illumination. Such an illumination monitoring and control system would automatically dim, or completely turn off, the artificial lighting system in an area of controlled lighting when natural illumination provides part or all of the required lighting level.

SUMMARY OF THE INVENTION

It is therefore an object of the present invention to provide an automatic, constant illumination level monitoring and control system for continuously monitoring the level of illumination in an area of controlled lighting and readjusting the artificial lighting to maintain a constant level of illumination.

A further object of the present invention is to provide an automatic, constant illumination level monitoring and control system which can be readily incorporated into incandescent, flourescent or high intensity gas discharge artificial lighting systems.

Another object of the present invention is to provide a constant illumination level control system which utilizes only solid state circuitry and components.

Still another object of the present invention is to provide a constant illumination level control system which is ecomonical in the manufacture and efficient in use.

Accordingly, to accomplish these and other objects, the present invention provides an automatic, constant illumination level monitoring and control system for regulating the electrical energy input to an artificial lighting system. The principal active elements in the constant illumination control system include a monostable multivibrator and a triac.

A source of alternating current is coupled through the triac to the artificial lighting system; the gate of the triac is coupled to the monostable multivibrator which controls the switching of the triac. Associated circuitry establishes the external time constant of the monostable multivibator and phase locks the output of the monostable multivibrator with the source of alternating current. By controlling the external time constant of the monostable multivibrator, the constant illumination level control system can control the phase-locked switching into and out of conduction of the triac, thereby controlling the portion of each half-cycle of alternating current power supplied to the artificial illumination system.

A photocell sensor in combination with an input amplifier is used to generate an illumination level voltage representative of the illumination level in the area of controlled lighting. The illumination level voltage is compared by a comparator with a reference voltage to yield a difference voltage output. Initially, the reference voltage to the comparator is adjusted so that a zero difference voltage output from the comparator results when total illumination in the area of controlled lighting, as indicated by the illumination level voltage, is at a desired level. Thereafter, any change in total illumination from this preset level is reflected in a change in the illumination level voltage, resulting in a non-zero difference voltage output from the comparator.

The difference voltage output of the comparator is applied to a timing network coupled to the monostable multivibrator. The timing network includes a transistor in combination with RC circuit to establish the external time constant of the monostable multivibrator and, consequently, the pulse duration of its output square wave. In the event of a non-zero difference voltage output from the comparator, indicating a change in the total illumination from the preset level, a charging capacitor included in the biasing network of the transistor is charged (or discharged). As the bias point of transistor changes, conduction increases (or decreases) changin the external RC time constant of the monostable multivibrator.

A triggering network is coupled to the monostable multivibrator to supply trigger pulses at each zero crossing of the alternating current sine wave. This phase locks the output square wave of the monostable multivibrator to the alternating current power being applied through the triac to the artificial lighting system. A gating network coupled between the output of the monostable multivibrator and the gate of the triac switches the triac into conduction at a time corresponding to the falling edge of each output pulse of the output square wave of the monostable multivibrator. Accordingly, the triac is conducting alternating current power to the artificial lighting system during only a portion of each half-cycle of the alternating current sine wave, this portion being determined by the external RC time constant of the monostable multivibrator.

For use with flourescent lighting systems a modified embodiment of the present invention includes circuitry for shutting off the power to the hot cathode elements of those flourescent lamps which are completely dimmed down by the operation of the constant illumination level control system.

The novel features believed to be characteristic of the present invention are set forth in particularity in the appended claims. However, a more complete appreciation of the present invention, both as to organization and mode of operation, and many of the attendant advantages thereof will result as the same becomes better understood by reference to the following detailed description when considered in conjunction with the accompanying drawings.

BRIEF DESCRIPTION OF THE DRAWINGS

FIG. 1 is a block diagram of the constant illumination level control system according to the present invention.

FIGS. 2a–h are illustrative waveform representations of the signals at selected points of illumination control circuit of the present invention.

DESCRIPTION OF THE PREFERRED EMBODIMENT

Figure 3:
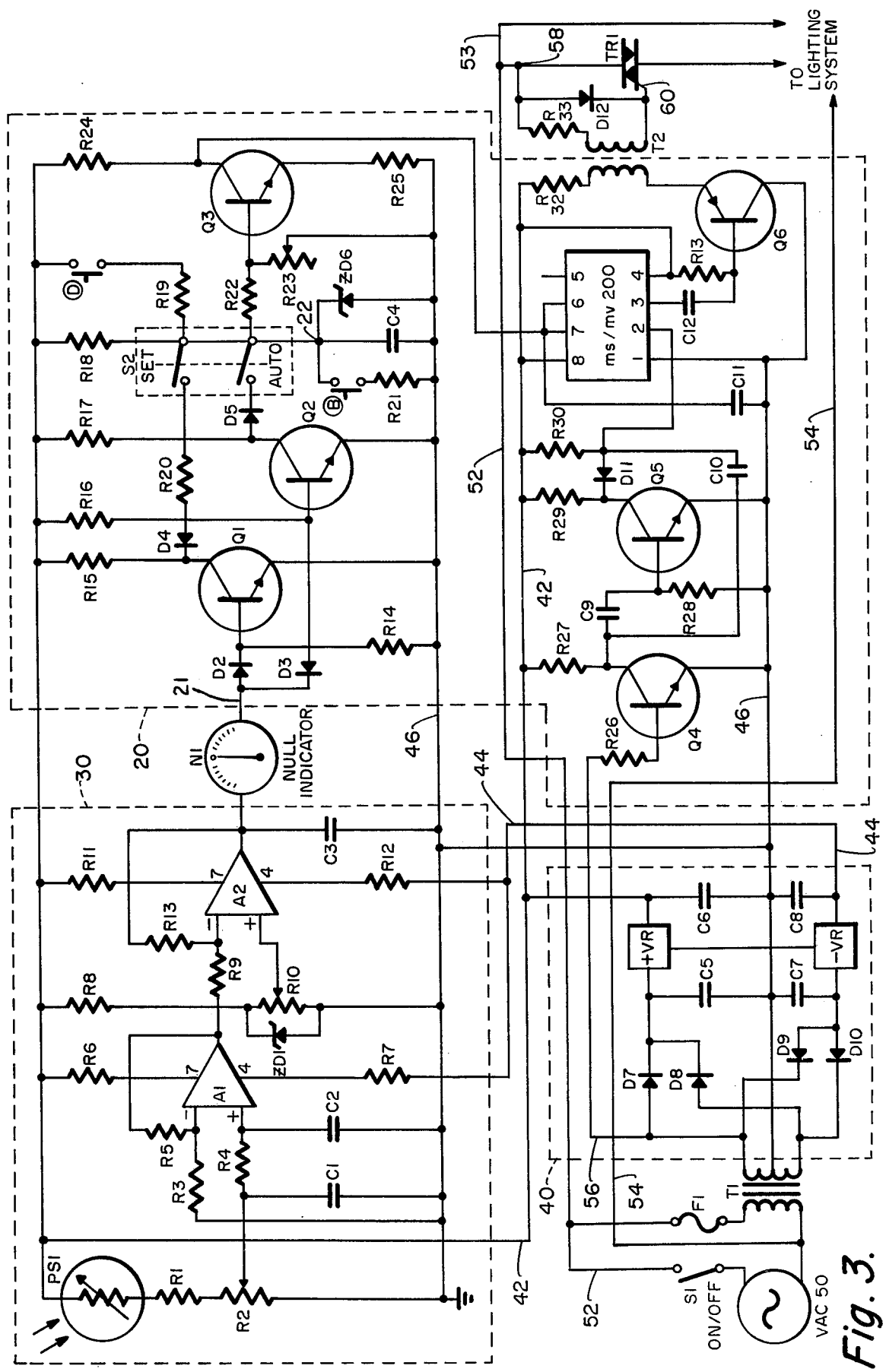
FIG. 3 is a schematic circuit diagram of a specific embodiment of the illumination control circuit of the present invention.

The constant illumination level monitoring and control system can be used to control the illumination output of an incandescent, a flourescent or high intensity gas discharge artificial lighting system. The constant illumination level control system monitors the illumination level from artificial or natural sources, in an area of controlled lighting, regulates the electrical energy input to the artificial lighting system and thereby controls the illumination level in the area of controlled lighting. Referring now to the drawings wherein like reference characters designate like or corresponding elements throughout the several views, the block diagram of FIG. 1 shows the general components of a constant illumination control system. A solid state switch 10 in combination with a solid state dimmer circuit 20 controls the lighting output of the artificial lighting system. To monitor the illumination level in the area of controlled lighting, a dimmer control circuit 30 includes a photocell sensor PS1, an input amplifier A1 and a comparator A2. The output of comparator A2 is coupled through a null-indicator N1 and a set-auto switch S2 to solid state dimmer circuit 20.

Referring now to the detailed circuit diagram in FIG. 3, conventional 60 cps alternating current power is supplied to the artificial lighting system by a source of alternating current VAC 50. The alternating current power is supplied, via a line 52, through a triac TR1 which comprises the solid state switch 10 in FIG. 1. In addition, alternating current power is applied through an ON/OFF switch S1 and a fuze F1 to the primary of a standard center-tap transformer T1. The secondary of transformer T1 is coupled to a power supply circuit 40 comprised of rectifying diodes D7, D8, D9 and D10; filtering capacitors C5, C6, C7 and C8; and two voltage regulators +VR and −VR. Power supply circuit 40 supplies positive bias supply voltage, via a positive supply line 42, and negative bias supply voltage, via a negative supply line 44, to the constant illumination level control system.

The constant illumination level control system regulates the alternating current power input to the artificial lighting system by controlling the switching into and out of conduction of triac TR1. Specifically, the constant illumination level control system functions to selectively gate triac TR1 such that the triac is conducting during only a portion of each half-cycle of the alternating current sine wave from alternating current VAC 50. As will be explained below, the portion of each half-cycle of the alternating current sine wave for which triac TR1 is conducting is determined by the monitored illumination level in the area of controlled lighting. To gate triac TR1 in this manner, gating pulses are selectively applied to the gate of triac TR1 through a gating network comprised of a pulse transformer T2, a resistor R33, and a diode D12. To provide these gating pulses to triac TR1, the constant illumination level lighting control system includes an integrated circuit, monostable multivibrator 200 which, together with transistors Q1 through Q6, comprises solid state dimmer circuit 20 (FIG. 1).

Monostable multivibrator 200 has associated with it a timing network for establishing the external time constant for the monostable multivibrator and a triggering network for phase locking the triggering of the monostable multivibrator with alternating current source VAC 50. The timing network comprises a transistor Q3, with a biasing capacitor C4, together with an RC time constant network. Capacitor C4 is coupled through a resistive network (resistors R22 and R23) to the base of transistor Q3; the charge level on capacitor C4 controls the bias point of transistor Q3, holding it at some operating point between cut-off and full conduction. The RC time constant network is comprised of a pair of resistors R24 and R25 and a capacitor C11. Resistor R24 is coupled to the collector of transistor Q3 while resistor R25 is coupled to the emitter of transistor Q3. Capacitor C11 and the collector of transistor Q3 are coupled to the external time constant inputs 6 and 7 to monostable multivibrator 200. Thus, resistors R22 and R23 and capacitor C11 form the external RC time constant network of monostable multivibrator 200. By varying the charge level on biasing capacitor C4 and, consequently, the conduction state of transistor Q3, this external time constant can be controlled so as to vary the output pulse duration of the output square wave of monostable multivibrator 200.

The triggering network coupled to monostable multivibrator 200 comprises a pair of transistors Q4 and Q5. Alternating current is applied from the secondary of transformer T1, via line 56, to the base of transistor Q4. The collector of transistor Q4 is coupled through a differentiating network comprised of a capacitor C9 and a resistor R28 to the base of transistor Q5. Both the collector of transistor Q4, through a differentiating network comprised of a capacitor C10 and a resistor R30, and the collector of transistor Q5, through a diode D11, are coupled to the triggering input 2 to monostable multivibrator 200. Referring to the illustrative waveforms in FIGS. 2a through h, an alternating current signal, illustrated in FIG. 2a appears on the base of transistor Q3. As this signal goes alternately positive and negative, transistor Q4 turns on and off forming a 180 degree phase-shifted square wave at the collector of transistor Q4 (FIG. 2b). This square wave is differentiated by capacitor C9 and resistor R28 yielding alternating positive and negative voltage spikes (illustrated in FIG. 2c) which appear on the base of transistor Q5. It should be noted that these alternating positive and negative voltage spikes occur at each zero and 180 degree crossing point of the alternating current sine wave. Transistor Q5 is normally biased in the off state. Thus, a positive voltage spike appearing on the base of transistor Q5 momentarily drives the transistor into conduction grounding the collector of transistor Q5 and inverting the voltage spike. The resulting negative-going voltage spike corresponding to each zero-degree crossing of the alternating current sine wave appears on the trigger input 2 to monostable multivibrator 200 (FIG. 2d). Simultaneously, the square wave voltage appearing on the collector of transistor Q4 is also differentiated by capacitor C10 and resistor R30, yielding a negative-going voltage spike for each 180 degree crossing of the alternating current signal; these negative-going voltages spikes also appear on the trigger input 2 to monostable multivibrator 200. Accordingly, the triggering network associated with monostable multivibrator 200 functions to trigger the monostable multivibrator with a negative-going voltage spike at each zero crossing of the alternating current sine wave from alternating current source VAC 50 (FIG. 2e). Consequently, the output of monostable multivibrator 200 illustrated in FIG. 2f is effectively phase-locked with the alternating current source VAC 50.

The phase-locked output square wave of monostable multivibrator 200 (output pin 3) is coupled through a differentiating network comprised of a capacitor C12 and a resistor R31 to the base of transistor (PNP) Q6. The emitter of transistor Q6 is coupled to pulse transformer T2 which, in turn, is coupled to the gate of triac TR1. Normally, transistor Q6 is biased to cutoff and no current flows through transformer T2. The phase-locked output square wave from monostable multivibrator 200 is differentiated by capacitor C12 and resistor R31 and appears on the base of transistor Q6 forming alternately positive and negative-going voltage spikes corresponding, respectively, to the rising and falling edges of the output square wave. These voltage spikes appear on the base of transistor Q6, which is driven momentarily to conduction in response to each negative-going voltage spike corresponding to the trailing edges of the output square wave from monostable multivibrator 200. As a result, negative-going voltage spikes also appear on the emitter of transistor Q6 and, consequently, across pulse transformer T2 (FIG. 2g). Each negative-going voltage spike appearing across pulse transformer T2 appears on the gate of triac TR1 as a positive-going voltage spike, turning it on to conduction. These gating voltage spikes correspond in time to each falling edge of the output square wave from monostable multivibrator 200. And, from above, the pulse duration of the phase-locked output square wave, and hence the falling edge of each of its component voltage pulses, is established by the external RC time constant of monostable multivibrator 200 and occurs at some time between the zero-crossings for each half-cycle of the alternating current sine wave. Accordingly, as illustrated in FIG. 2h, triac TR1 is conducting and coupling electrical energy to the artificial lighting system, only during a portion of the alternating current sine wave from alternating current source VAC 50.

As noted above, the function of the constant illumination level control system is to continuously regulate the portion of each half-cycle of the alternating current sine wave supplied via triac TR1 to the artificial lighting system. This is accomplished by controlling the charge level on capacitor C4 which biases transistor Q3. This controls the conduction of transistor Q3 and, consequently, the external time constant of monostable multivibrator 200. After the initial calibration of the constant illumination level control system, which will be explained below, the charge level on biasing capacitor C4 is established by dimmer control circuit 30 (photocell sensor PS1, input amplifier A1 and comparator A2) together with transistors Q1 and Q2 in solid state dimmer circuit 20. Photocell sensor PS1 acts as a variable resistor: if the illumination level in the area of controlled lighting decreases, the resistance of photocell PS1 increases and vice versa. Photocell sensor PS1 together with a resistor R1 and a potentiometer R2 establish the voltage which is applied through an RC filtering network (a resistor R4, a capacitor C1 and a capacitor C2) to the noninverting input to input amplifier A1. The amplified voltage appearing on the output of input amplifier A1 is applied through a resistor R9 to the inverting input to comparator A2. Comparator A2 comprises an operational amplifier configured as a comparator, the output of the operational amplifier being coupled through a resistor R13 to the inverting input to the operational amplifier while the noninverting input to the operational amplifier is coupled to the center-tap of a potentiometer R10. Potentiometer R10 establishes the voltage reference input to comparator A2. Comparator A2 generates a difference voltage output which comprises the output of dimmer control circuit 30.

The initial calibration of the constant illumination level control system to a desired level of illumination in the area of controlled lighting is accomplished as follows. ON/OFF switch S1 is positioned to the ON (closed) position, supplying alternating current power through triac TR1 to the artificial lighting system. Set auto switch S2 is positioned to the set (open) position, disconnecting solid state dimmer circuit 20 from dimmer control circuit 30. This permits the level of illumination to be established, manually controlling the artificial illumination system by means of two buttons designated dim (D) and brighten (B). If it is desired to dim the artificial lighting system, the dim button is pressed coupling positive supply line 42 through a resistor R19 to biasing capacitor C4. This increases the charge level on biasing capacitor C4 causing an increase in the conduction of transistor Q3. This results in an increase in the external RC Time constant (determined by resistors R24 and R25 and capacitor C11) of monostable multivibrator 200 and an increase in the pulse duration of the output square wave of the monostable multivibrator. From above, this causes triac TR1 to be gated closer to 180 and 360 electrical degrees of the alternating current sine wave from alternating current source VAC 50. Thus, alternating current power flows through triac TR1 to the artifical lighting system for a reduced portion of each half-cycle of the alternating current sine wave, reducing the illumination output from the artificial lighting system. The initial manual brightening of the artificial lighting system is accomplished analogously. The brighten button is depressed allowing biasing capacitor C4 to discharge through resistor R21, decreasing the charge level on capacitor C4 and the bias point of transistor Q3. This decreases the external RC time constant and the pulse duration of the output square wave. As a result, triac TR1 is gated on closer to zero and 180 electrical degrees of the alternating current sine wave, coupling alternating current power to the artificial lighting system for an increased portion of the alternating current sine wave.

When the desired illumination level in the area of controlled lighting is manually established, potentiometer R10 is adjusted to yield a voltage reference input to comparator A2 such that the output difference voltage of comparator A2 is zero (as indicated on null indicator N1). This completes the calibration of the constant illumination level control system to the desired, manually set illumination level and set/auto switch S2 is positioned to the auto (closed) position, coupling solid state dimmer circuit 20 to dimmer control circuit 30. Thereafter, the charge level on biasing capacitor C4 and hence, the illumination output of the artificial lighting system is controlled by dimmer control circuit 30.

Consider the situation where the illumination level in the area of controlled lighting falls below the desired illumination level preset by the initial calibration of the constant illumination level control system. With a decrease in the illumination level, the resistance of photocell PS1 increases, decreasing the voltage drop across potentiometer R2 and, consequently, the voltage appearing at the noninverting input to input amplifier A1. As a result, the voltage appearing at the inverting input to comparator A2 becomes less than the reference voltage appearing on the noninverting input to the comparator. Thus, the output difference voltage of comparator A2 becomes some positive value which appears on the base of transistor Q1 through a diode D2. Normally, transistor Q1 is biased to an off state, the voltage appearing on the collector of transistor Q1 back-biasing diode D4. A positive output difference voltage from comparator A2 turns on transistor Q1, grounding the collector of transistor Q1 and forward biasing dode D4. Set/auto switch S2 being in the auto (closed) position, this allows biasing capacitor C4 to slowly discharge through a resistor R17, diode D4 and transistor Q1, reducing the charged level of capacitor C4. As in the above described manual operation, this reduction in the charged level on capacitor C4 results in a decrease in both the external RC time constant of monostable multivibrator 200 and the pulse duration of the output square wave. Accordingly, triac TR1 is gated ON closer to the zero and 180 electrical degree crossings of the alternating current sine wave from alternating current source VAC 50, increasing the portion of each half-cycle of alternating current power supplied to the artificial lighting system. As the artificial lighting system brightens and the illumination level in the area of controlled lighting increases, the resistance of photocell PS1 gradually decreases, increasing the voltage appearing at the inverting input to comparator A2. When this voltage is equal to the reference voltage, the difference voltage output from comparator A2 becomes zero turning off transistor Q1. Biasing capacitor C4 no longer can discharge through resistor R17, diode D8 and transistor Q1, which stabilizes the charge level on the capacitor and, consequently, the external RC time constant of monostable multivibrator 200.

Assume, now, that the illumination level in the area of controlled lighting increases above the desired, preset illumination level. The resistance of photocell PS1 decreases, increasing the voltage drop across potentiometer R2 and increasing the voltage appearing at the non-inverting input to input amplifier A1. consequently, the voltage appearing at the inverting input to comparator A2 increases above the reference voltage input and the output difference voltage from comparator A2 becomes a negative value. This negative output difference voltage from comparator A2 appears on the base of transistor Q2 ahrough diode D3. Normally, transistor Q2 is biased to full conduction, holding the collector of transistor Q6 at ground potential and back-biasing diode D5. A negative output difference voltage from comparator A2 turns off transistor Q2, forward biasing diode D5. With set/auto switch S2 in the auto (closed) position, this allows biasing capacitor C4 to be slowly charged through a resistor R17 and diode D5. The increased charged level on capacitor C4 increases the bias point of transistor Q3 resulting in an increase in both the external RC time constant of monostable multivibrator 200 and the pulse duration of the output square wave. Accordingly, as in the above described manual operation, triac TR1 conducts alternating current power to the artificial lighting system for a reduced portion of each half-cycle of the alternating current sine wave from alternating current source VAC 50, dimming the artificial lighting system.

It should be noted that should it be desired that the level of illumination in the area of controlled illumination remains at a fixed level of illumination, the automatic/set switch S2 should remain in the set (open) position. This disconnects dimmer control circuitry 20 from solid state dimmer circuitry 30. Then by adjusting the level of artificial illumination to obtain the desired illumination level in the area of controlled lighting (using the dim and brighten buttons) the illumination level in the area of controlled lighting remains at this level regardless of a change in the level of natural illumination.

Figure 4:
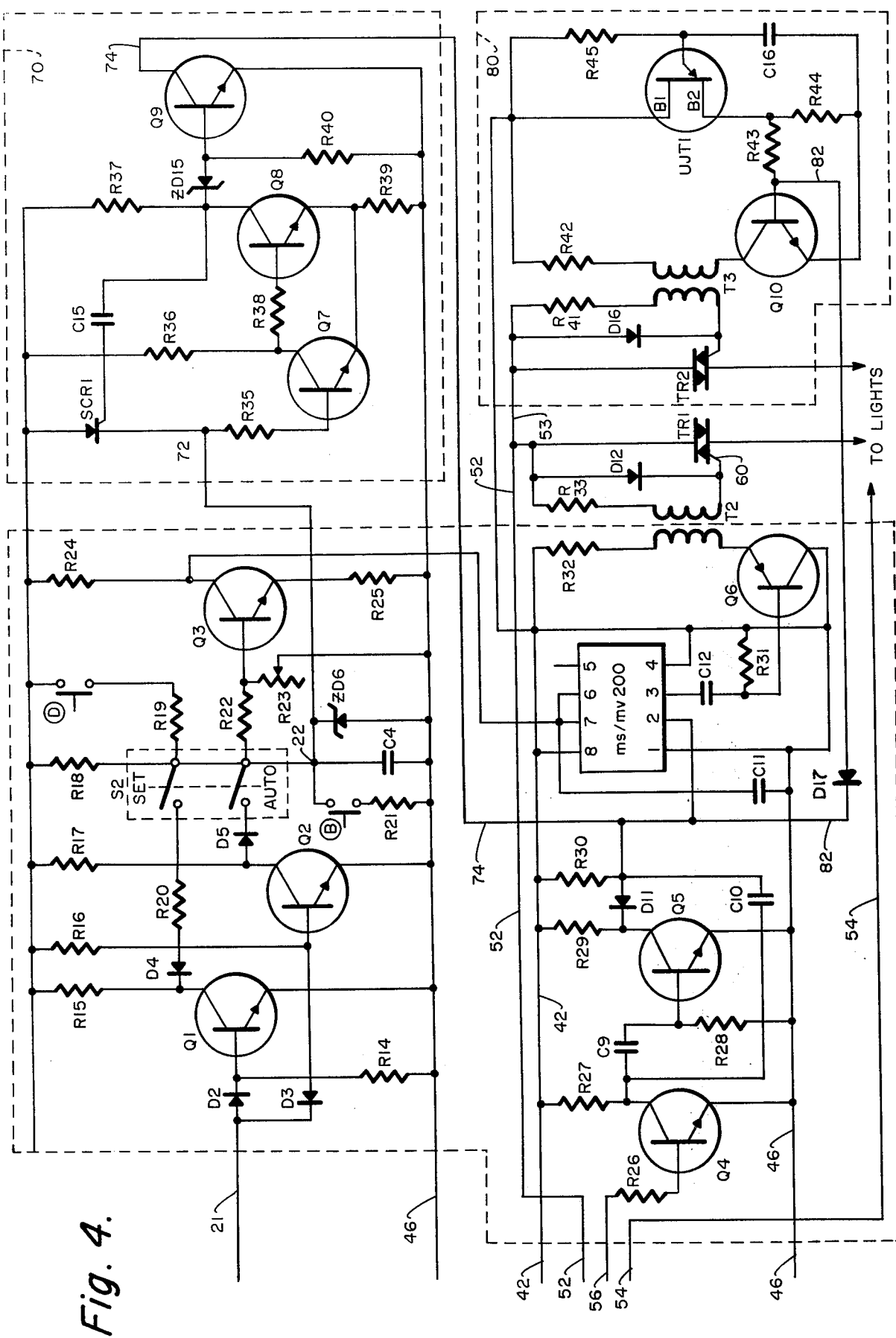
FIG. 4 is a schematic circuit diagram of a portion of a second embodiment of the present invention, modified for use with flourescent lighting systems.

As noted above, the constant illumination level lighting control system is for use with flourescent, incandescent and high intensity gas discharge artificial lighting systems. However, flourescent lighting systems require, in addition to a line to supply current for ionization and lighting output, a line to supply power to the hot cathode elements on either end of each flourescent lamp. This second line supplies the necessary heater voltage and start up voltage to the flourescent lamp. For a flourescent artificial lighting system, the specific embodiment in FIG. 3 of the constant illumination level control system supplies ionization current to the flourescent lamps via line 52 and triac TR1. A line 53 is available to supply electrical energy to the hot cathode elements. In the normal operation of the specific embodiment, should a particular flourescent lamp be dimmed completely off as the result of available natural illumination, power would still be supplied via line 53 to the hot cathode elements of the lamp albeit for no useful purpose. Accordingly, a modified embodiment of the present invention for use with a flourescent artificial lighting system includes circuitry to terminate the electrical energy input to the hot cathode elements of those flourescent lamps which are dimmed off by the operation of the constant illumination level control system. Specifically, FIG. 4 introduces a dimming threshold circuit 70 and a cathode power control circuit 80, both coupled to solid state dimmer control circuit 20 of the constant illumination level control system. Essentially, dimming threshold circuit 70 monitors the charge level of biasing capacitor C4. When biasing capacitor C4 charges to a voltage level which would result in the dimming off of any portion of the flourescent lighting, dimming threshold circuit 70 operates to cause cathode power control circuit 80 to interrupt the power flow to the respective hot cathode elements.

Alternating current power is supplied via line 53 through a triac TR2 to the hot cathode elements of the flourescent lamps. Cathode power control circuit 80 controls the gating of triac TR2 and, thereby, the power flow to the hot cathode elements. A unijunction transistor UJT1 is employed as a relaxation oscillator, generating a train of positive voltage pulses which appear on the base B2 of the unijunction transistor. The period of this pulse train is determined by the RC relaxation circuitry, comprised of a resistor R45 and a capacitor C16 coupled to the emitter of unijunction transistor UJT1. The pulse train appearing on the base B2 of UJT1 is applied through a resistor R43 to the base of a transistor Q10. Transistor Q10 is normally biased to the off state; the positive voltage pulses from UJT1 result in a corresponding pulse train output appearing on the collector of transistor Q10. These pulses appearing on the collector of transistor Q10 are applied across a pulse transformer T3 to the gate input to triac TR2. The frequency of the output voltage pulse train from unijunction transistor UJT1, as established by its RC relaxation network, is by design high enough that triac TR2 remains on during the time these positive voltage pulses are applied to the gate input to triac TR2.

Threshold circuit 70 is coupled to solid state dimmer circuit 20 of the constant illumination level control system; biasing capacitor C4 is coupled via a line 72 to the base of a transistor Q7. Transistor Q7 and a transistor Q8 together with associated resistors form a schmitt trigger. The threshold triggering point of the schmitt trigger, established by a resistor R39, is set to correspond to that charge level on biasing capacitor C4 which would result in the dimming off of the flourescent lamps. If the charge level on capacitor C4 reaches this dimming off level, the schmitt trigger (transistors Q7 and Q8) fires, gating on a silicon controlled rectifier SCR1 and causing the zener diode ZD15 to break down. The gating on of SCR1 fully charges capacitor C4, stabilizing the schmitt trigger network, while the break down of zener diode ZD15 places a positive voltage on the base of a transistor Q9, turning it on to conduction. Turning transistor Q9 fully on essentially grounds both trigger input pin 2 of monostable multivibrator 200 and the base of transistor Q10. As a result, monostable multivibrator 200 and transistor Q10 are both turned off, insuring that no gating voltage pulses are applied to the gate input to either of the triacs TR1 and TR2, shutting them off. Accordingly, the electrical energy input to the hot cathode elements of the dimmed flourescent lamps is interrupted, maximizing the conservation of energy.

Obviously, other embodiments and modifications of the present invention will readily come to those of ordinary skill in the art having the benefit of the teachings presented in the foregoing description and the drawings. It is therefore to be understood that this invention is not to be limited thereto and that said modifications and embodiments are intended to be included within the scope of the appended claims.

What is claimed is:

1. An illumination level control system for maintaining a predetermined level of total illumination in an area of controlled lighting comprising:
   a. lighting means for generating artificial illumination in the area of controlled lighting;
   b. a first solid state switch coupled between said lighting means and a source of alternating current power; said first solid state switch having a gate input and being operable by a gating signal applied to the gate input to electrically connect or disconnect said lighting means and the source of alternating current power;
   c. monitoring means for monitoring the level of illumination in the area of controlled lighting and generating an illumination level voltage corresponding thereto;
   d. comparing means coupled to said monitoring means for comparing the illumination level voltage from said monitoring means with a reference voltage and generating an output difference voltage corresponding to the difference between the output of said monitoring means and the reference voltage;
   e. a monostable multivibrator circuit coupled to the gate input to said first solid state switch for generating the gating signal operable to switch said first solid state switch into and out of the conducting state;
   f. a timing circuit coupled between said comparing means and said monostable multivibrator circuit operable to establish the external time constant of said monostable multivibrator circuit;
   g. a triggering circuit coupled between said monostable multivibrator and the source of alternating current power for triggering said monostable multivibrator;
   h. said timing circuit in combination with said triggering circuit being operable to control the gating signal from said monostable multivibrator and, thereby, regulate the amount of power supplied to said lighting means.

2. The system as recited in claim 1 wherein said comparing means comprises:
   a. an operational amplifier (A2) having inverting and noninverting inputs and an output which comprises the difference voltage output of said comparing means; and
   b. a potentiometer coupled to the noninverting input to said operational amplifier for establishing the reference voltage input to said comparator;
   c. said inverting input to said operational amplifier being coupled to said monitoring means to receive the illumination level voltage from said monitoring means.

3. The system as recited in claim 2 wherein said timing circuit comprises:
   a. a capacitor (C4);
   b. a transistor (Q3) having a base coupled to said capacitor (C4);
   c. a bias control circuit coupled to said capacitor (C4) being operable by the output difference voltage from said comparator to control the charging or discharging of said capacitor (C4) and, thereby, the bias point of said transistor (Q3); and
   d. an RC network coupled between said transistor (Q3) and said monostable multivibrator such that said RC network in combination with said transistor (Q3) determines the external time constant of said monostable multivibrator;
   e. said bias control circuit in combination with said capacitor (C4) being operable to control the level of conduction of said transistor (Q3) and, thereby, the external time constant of said monostable multivibrator.

4. The system as recited in claim 3 wherein said bias control circuit comprises:
   a. A transistor Q1 having a base coupled through a diode (D2) to the output of said operational amplifier (A2) and a collector coupled through a diode (D4) to said capacitor (C4);
   b. a transistor (Q2) having a base coupled through a diode (D3) to the output of said operational amplifier (A2) and a collector coupled through a diode (D5) to said capacitor (C4);
   c. said transistor (Q1) being operable by a positive output difference voltage appearing at the output of said operational amplifier (A2) to establish a discharge path for said capacitor (C4); and said transistor (Q2) being operable by a negative output difference voltage appearing at the output of said operational amplifier (A2) to establish a charging path for said capacitor (C4).

5. The system as recited in claim 4 wherein said triggering circuit comprises:
   a. a pair of transistors (Q4) and (Q5); and
   b. first and second differentiating networks;
   c. said transistor (Q4) having a base coupled to receive an alternating current input from the source of alternating current power to said lighting means and a collector coupled both through said first differentiating network to a base of said transistor (Q5) and through said second differentiating network to the trigger input to said monostable multivibrator;

d. said transistor (Q5) having a collector coupled to the trigger input to said monostable multivibrator;

e. said triggering circuit being operable to trigger said monostable multivibrator at each zero crossing (0 and 180 electrical degrees) of the alternating current input.

6. The system as recited in claim 5 further comprising:

a. a third differentiating network coupled to the output of said monostable multivibrator;

b. a pulse transforming network coupled between said third differentiating network and the gate input to said first solid state switch;

c. said third differentiating network in combination with said pulse transforming network being operable to apply a gating signal comprised of gating voltage spikes to the gate input to said first solid state switch; the gating voltage spikes corresponding in time to the trailing edges of the output square wave from said monostable multivibrator, thereby switching said solid state switch on to conduction for a portion of each half-cycle of alternating current from the source of alternating current power.

7. The system as recited in claim 4 further comprising calibrating means coupled between said comparing means and said timing circuit for manually establishing, in combination with said potentiometer, the level of illumination to be maintained in an area of controlled lighting.

8. The system as recited in claim 7 wherein said lighting means comprises a plurality of flourescent lamps.

9. The system as recited in claim 8 further comprising cathode power control means for interrupting power to the hot cathode elements of those flourescent lamps dimmed off by the operation of said illumination level control system.

10. The system as recited in claim 9 wherein said cathode power control means comprises:

a. voltage sensing means for sensing the voltage on said capacitor (C4) and generating an interrupt signal indicative of a voltage level on said capacitor (C4) corresponding to the dimming of said flourescent lamps;

b. a second solid state switch coupled between the hot cathode elements of said flourescent lamps and a source of power; said second solid state switch having a gate input and being operable by a gating signal applied to the gate input to electrically connect or disconnect said hot cathode elements and the power source; and c. gating means coupled to the gate input to said second solid state switch for generating the gating signal operable to switch said second solid state switch into and out of the conducting state;

d. said gating means being responsive to the interrupt signal from said voltage sensing means to switch said second solid state switch out of conduction while said flourescent lamps are dimmed off; thereby interrupting the power flow to the hot cathode elements of said flourescent lamps.

11. The system as recited in claim 10 wherein said gating means comprises:

a. a unijunction transistor (UJT1);

b. an RC relaxation network coupled to the emitter of said unijunction transistor (UJT1);

c. said unijunction transistor (UJT1) in combination with said RC relaxation network comprising a relaxation oscillator which generates a train of output voltage pulses at a frequency determined by said RC relaxation network; and d. a transistor (Q10) having a base coupled to receive the output voltage pulses from said unijunction transistor (UJT1) and a collector coupled to the gate of said second solid state switch;

e. said unijunction transistor (UJT1) in combination with said transistor (Q10) generating the gating signal for said second solid state switch, the gating signal comprising a train of voltage pulses at a frequency such that said second solid state switch is continuously conducting during the time the gating signal is applied to the gate input to said second solid state switch.

12. The system as recited in claim 11 wherein said voltage sensing means comprises:

a. a pair of transistors (Q7 and Q8) comprising a schmitt trigger; said schmitt trigger having an input comprising the base of said transistor (Q7) and an output comprising the collector of transistor (Q8);

b. the triggering point at which the output of said schmitt trigger switches from a low to a high state being established at that voltage level on said capacitor (C4) corresponding to the dimming off of said flourescent lamps; and c. a transistor (Q9) having a base coupled to the output of said schmitt trigger and a collector coupled to the base of said transistor (Q10); said transistor (Q9) being switched from a non-conducting to a conducting state when the output of said schmitt trigger switches to a high state, grounding the collector of said transistor (Q9) and, thereby, generating the interrupt signal output of said voltage sensing means;

d. said transistor (Q10) being operable by said interrupt signal to interrupt the gating signal input to said second solid state switch, thereby switching said second solid state switch to the non-conducting state and interrupting the power flow to the hot cathode elements of said flourescent lamps.

13. The system as recited in claim 10 wherein each of said first and second solid state switches comprises a triac.

14. The system as recited in claim 13 wherein said monitoring means includes a photovoltaic device.

* * * * *